Figure 1:
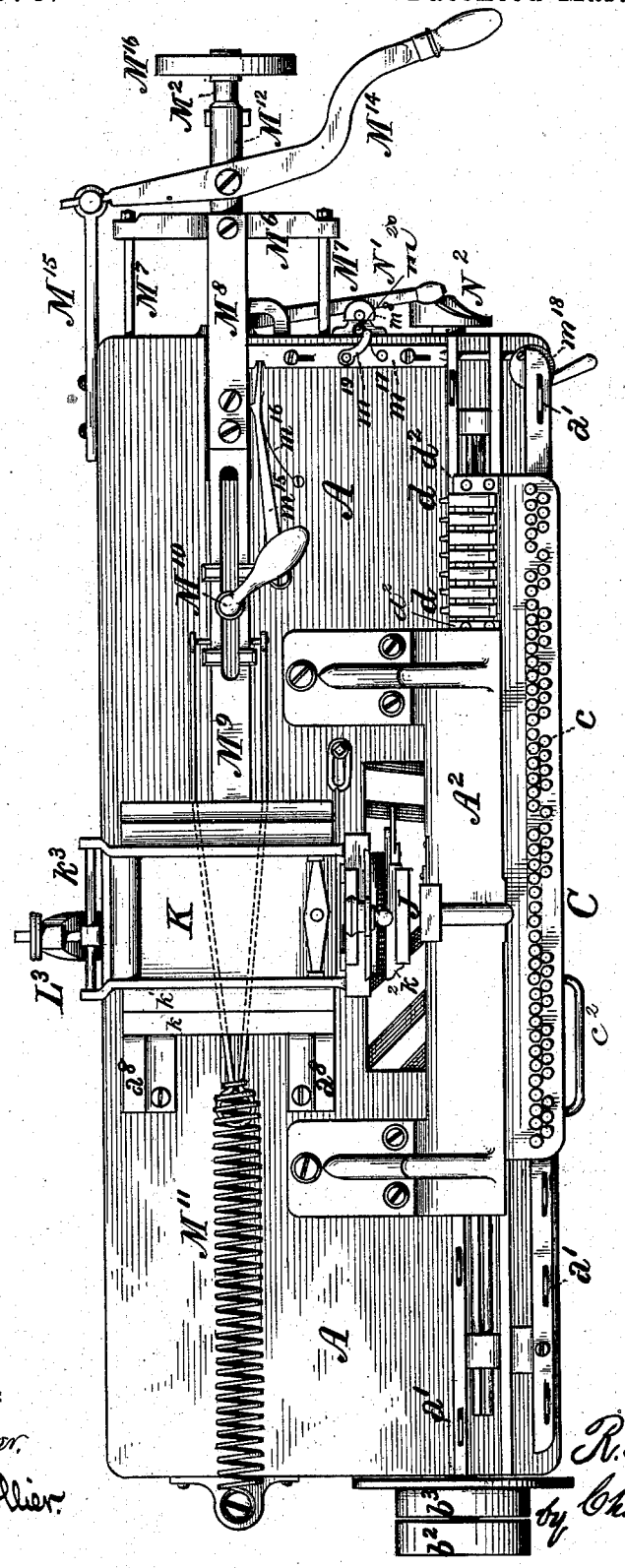

(No Model.) 12 Sheets—Sheet 1.
R. L. KIMBERLY.
MACHINE FOR MAKING MATRICES.

No. 295,878. Patented Mar. 25, 1884.

WITNESSES:
INVENTOR
R. L. Kimberly,
by Chas. B. Collier
Atty (No Model.)

R. L. KIMBERLY.

MACHINE FOR MAKING MATRICES.

No. 295,878. Patented Mar. 25, 1884.

WITNESSES:

INVENTOR (No Model.) 12 Sheets—Sheet 5.

R. L. KIMBERLY.
MACHINE FOR MAKING MATRICES.

No. 295,878. Patented Mar. 25, 1884.

WITNESSES: INVENTOR (No Model.)                               12 Sheets—Sheet 6.

R. L. KIMBERLY.
MACHINE FOR MAKING MATRICES.

No. 295,878.                              Patented Mar. 25, 1884.

WITNESSES:                                         INVENTOR (No Model.) 12 Sheets—Sheet 7.
R. L. KIMBERLY.
MACHINE FOR MAKING MATRICES.
No. 295,878. Patented Mar. 25, 1884.
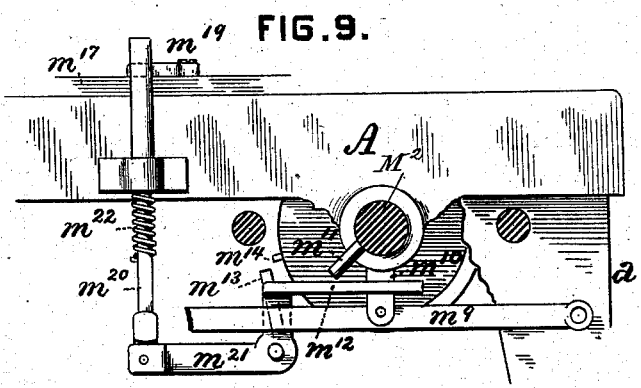
FIG. 9.
FIG. 11.
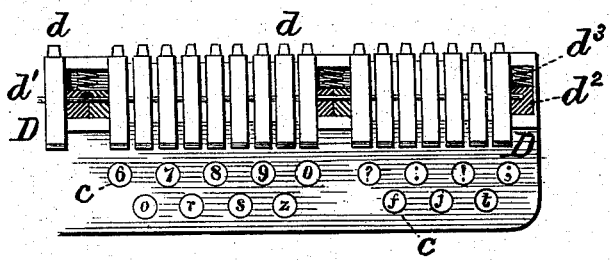
FIG. 13.
FIG. 10.
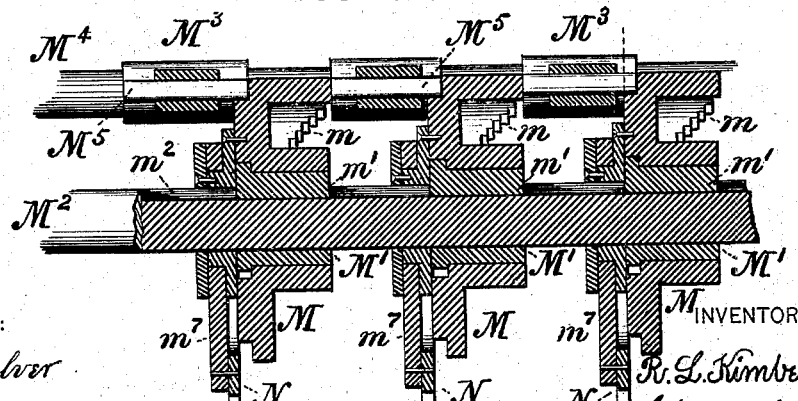
WITNESSES:
N. H. Culver
Geo. B. Collier
INVENTOR
R. L. Kimberly,
by Chas. B. Collier
Atty.

(No Model.)  R. L. KIMBERLY.  12 Sheets—Sheet 8.
MACHINE FOR MAKING MATRICES.

No. 295,878.  Patented Mar. 25, 1884.

WITNESSES:  INVENTOR (No Model.) 12 Sheets—Sheet 9.

R. L. KIMBERLY.
MACHINE FOR MAKING MATRICES.

No. 295,878. Patented Mar. 25, 1884.

WITNESSES:

INVENTOR
R. L. Kimberly,
by Chas. B. Collier,
Atty.

(No Model.)  12 Sheets—Sheet 10.

R. L. KIMBERLY.
MACHINE FOR MAKING MATRICES.

No. 295,878. Patented Mar. 25, 1884.

WITNESSES:

INVENTOR (No Model.) 12 Sheets—Sheet 11.

R. L. KIMBERLY.
MACHINE FOR MAKING MATRICES.

No. 295,878. Patented Mar. 25, 1884.

WITNESSES:
INVENTOR
R. L. Kimberly

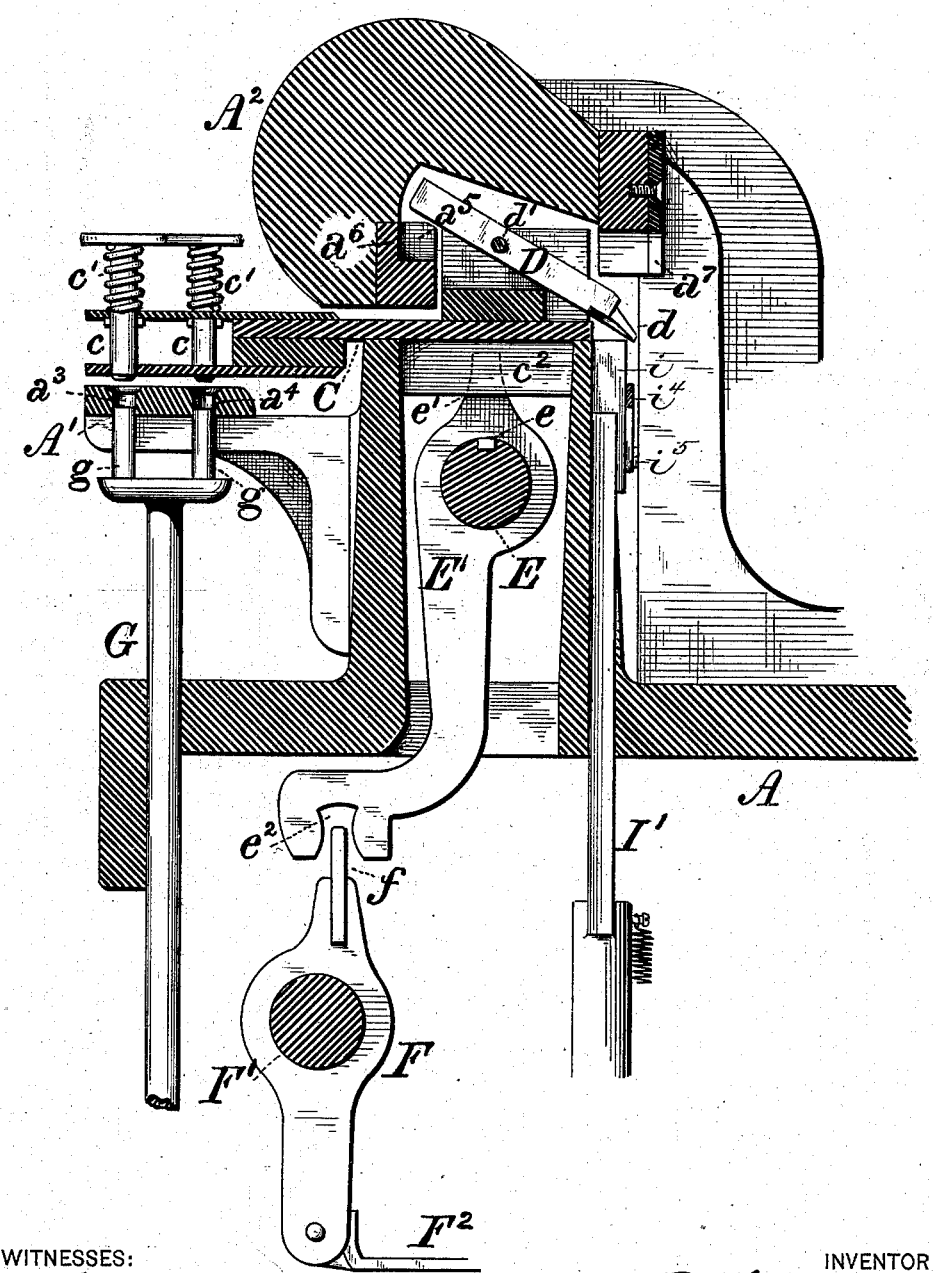

UNITED STATES PATENT OFFICE.

ROBERT L. KIMBERLY, OF PHILADELPHIA, PENNSYLVANIA, ASSIGNOR TO THE AMERICAN MATRIX MACHINE COMPANY, OF NEW YORK.

MACHINE FOR MAKING MATRICES.

SPECIFICATION forming part of Letters Patent No. 295,878, dated March 25, 1884.

Application filed December 10, 1883. (No model.)

*To all whom it may concern:*

Be it known that I, ROBERT L. KIMBERLY, of the city and county of Philadelphia, and State of Pennsylvania, have invented certain new and useful Improvements in Machines for the Manufacture of Matrices, of which improvements the following is a specification.

My invention relates to the formation of matrices or molds for the production of plates for letter-press printing by the impression, in proper sequence and relation, of selected members of a series of type and character dies into a suitable medium without the employment of set forms of type and without the practice of the operations of hand composition, distribution, &c., which are necessary preliminaries in the ordinary method of manufacturing stereotype-plates.

My improvements consist in matrix blanks or beds, and in certain novel devices and combinations of mechanism embodied and performing their several functions in an organized structure or machine for forming impressions in matrix blanks or beds, as hereinafter fully set forth, the same comprising an insertible and removable key-board carrying a series of letter and character dies of special construction, and a series of keys by which any desired die may be selected and the key-board brought into and fixed in proper position to admit of the formation of an impression of said die in a matrix-blank; an improved movable chuck, holder, or carrier adapted to receive and hold a matrix blank or bed; mechanism, substantially as described, actuated by the movements of the key-board and keys, and serving to impart different degrees of movement to the matrix-blank holder in a direction parallel to the line of movement of the key-board; mechanism, substantially as described, for adjusting and securing any selected die of the series in a firm bearing against a fixed abutment and in proper position relatively to the face of the matrix-blank to form an impression therein; mechanism, substantially as described, for moving the matrix-blank holder toward the face of the selected and adjusted die for such distance and with such pressure as will effect the impression of said die into the matrix-blank; mechanism, substantially as described, for withdrawing each die from its adjusted position after having made its impression, to admit of the lateral movement of the matrix-blank carrier and the adjustment of the next required die for a new impression; mechanism for withdrawing the matrix-blank carrier from the position occupied during the formation of the impression, and mechanism for periodically imparting movement to the matrix-blank carrier perpendicularly to the line of movement of the key-board. The improvements claimed are hereinafter fully set forth.

To enable those skilled in the art to practice my invention, I have illustrated in the accompanying drawings the construction of a machine in which the above-mentioned elements and combinations of mechanisms are embodied. A detailed description thereof, in order to be fully intelligible, must necessarily involve to a greater or less extent the recital of sundry constructive details of the mechanism upon the employment of which, specifically, my invention is not, of necessity, dependent, and for which any known equivalents may be substituted. I shall therefore, preparatory to entering upon such detailed description, proceed to explain, in as brief and general terms as may be, the general structure and mode of operation of a machine such as that referred to above.

Having provided a blank, block, or bed of any material or composition the texture, consistency, and permanent character of which render it suitable for the formation of a matrix—as, for example, pine wood—and a series of raised or male dies of sufficient hardness and sharpness of outline to form a depressed counterpart in the blank, each of said dies having the form of a letter or character required for typographical or letter-press reproductions of manuscript, of printed copy, or of dictated matter, and being carried by a proper stock or body, the impression of said dies into the blank is effected by locating and holding them successively in the required sequence against an end abutment in a fixed guide or socket, and forcing the blank against their faces by the application of such a degree of pressure to the blank as will suffice to indent or impress the dies therein to a required and uniformly-regulated depth. After each impression the blank is retired from the face of the die, moved the proper distance to present its surface for another impression, and the operation is repeated until the matrix is finished.

The essential instrumentalities of a mechanical structure such as that of which a general outline has been given above are a series of dies and stocks, a fixed guide and abutment adapted to receive and hold any one of said series, means for selecting and locating a die-stock therein, a matrix-blank holder, means for forcing the matrix-blank against the faces of the dies when located, means for governing the depths of the impressions, means for withdrawing the matrix-blank from the face of the die after each impression, and means for moving the matrix-blank holder to successively present another portion of the surface of the blank, after each impression, in proper relation to that portion on which the impression has been formed.

In the machine illustrated in the drawings a series of letter and character dies the width of the faces of which is greater or less, as the case may be, as governed by a determined mutual relation, are formed upon or secured to the ends of stocks or bodies which are pivoted in bearings in a key-board fitted to slide freely between guides on the top of a supporting frame or table, and to be insertible in and removable from said frame at pleasure. Each die-stock is located on the key-board in such position relatively to a key marked with a letter or character corresponding with its die that when, on depression of a key and on moving the key-board, said key is inserted in an opening in the table, the die-stock will be brought into a guide or socket and locked in position therein with its end opposite the die bearing against a fixed abutment on the frame. A matrix-blank holder having the capacity of movement in three directions—to wit, toward and from the face of the adjusted die, laterally relatively thereto, and vertically—is fitted to slide in guides upon the table, and is adapted to be moved toward and from the die by the vibration of a rocking lever which is coupled to the rod of an eccentric or cam on a driving-shaft connected by a clutch-coupling and tripping mechanism with a countershaft rotated by any suitable prime mover. A series of circumferentially-flanged disks, the flanges of which are cut into steps or serrations corresponding in depth with the width which is required to be occupied in a line of typography by any of the several characters (and its proper lateral spaces) of the class or series to which each disk is apportioned, is mounted to slide loosely upon a common shaft. Between said disks there are hung sliding pieces, which, with the disks, are so arranged that while the series of disks is fixed at one end as against longitudinal movement the revolution of any one of the disks upon the shaft from a higher to a lower serration will allow all the remaining disks on the side opposite the fixed end to be closed together by a spring or weight, thus diminishing the total depth of the series by the depth of the serrations embraced in a given movement of the disk. A series of ratchet-teeth is formed upon each of the disks, and the members of a series of pivoted anchor or pawl pieces are adapted, respectively, to engage said ratchet-teeth. Each of said anchor-pieces is coupled to a rocking arm, which, by the location of any die of its class in position to be impressed, is caused to be vibrated by the rotation of the counter-shaft, and, by effecting a coincident movement of the anchor-piece to which it is coupled, to turn the disk with the ratchet-teeth of which said anchor-piece engages one serration. By such movement of the disk the action of a spring or weight is exerted upon the matrix-blank holder, which is thereby moved an equal distance. Three cams are secured upon the counter-shaft, one of which operates a rod which bears against the forward downwardly-inclined end of the selected die and moves it into and locks it in position for impression. Another operates a lever which actuates a device for rotating the proper feed-disk, and the third releases the tension of a spring bearing on the series of disks to admit of such rotation. The operator, being provided with a sheet or piece of copy to be reproduced, and having secured the matrix-blank in the carrier and turned the series of feed-disks so that their highest serrations shall be uppermost—or, in other words, that the series of feed-disks shall be opened out to its greatest length on the supporting-shaft—selects the letter or character die which he desires to first impress into the blank by placing a finger upon the key. He then slides the key-board in one or the other direction, as required, until the selected key, under the pressure of the finger, drops into an opening in a plate on the table and primarily actuates the operating mechanism by striking a rod, which trips a clutch upon the constantly-rotating counter-shaft, and thereby imparts one revolution to the driving-shaft upon which the eccentric and cams are secured. The first result that follows from the rotation of the driving-shaft is the partial rotation of the feed-disk of the class to which the selected letter or character belongs, which disk is rotated from its highest to its next lower serration by the first of the three cams before mentioned, acting through intermediate connections. The following disks of the series, and with them the matrix-block holder, close up or move to the left the distance required by the selected letters, thus bringing the matrix-blank into proper position to receive the impression. The next result in sequence is the action of another of the three cams aforesaid, which thrusts upward a rod that bears against the lower forward end of the selected die, thereby bringing it to a horizontal position and clamping it in its guide, with its rear end bearing against the fixed abutment. The next result is the forward traverse of the matrix-blank carrier, which is effected by the rotation of the eccentric, cam, or crank on the driving-shaft, which rotating member, through its intermediate connections, drives the matrix-blank holder forward toward the face of the die, and thereby impresses the latter into the matrix-blank to a determined depth, as governed by a stationary shield, guide, or guard. The eccentric, in completing its revolution, carries back the matrix-blank holder to its former position, and the third cam, through its connections, relaxes the tension of the spring or weight from the series of feed-disks, in order that any one of them may be free to be moved prior to the next succeeding impression. Coincidently with the retraction of the matrix-blank holder, the selected die is unlocked from its position in the guide and returned to its initial position, in order to admit of the movement of the key-board and the selection of the next required die. This return of the die is effected by a link-connection operated by the downward movement of the rod which has served to fix the die in position. The operations above recited are repeated, by the selection of the proper dies, until a line of impressions is formed in the matrix-blank. Upon the completion of a line, the operator, by means of a hand-lever, draws apart the series of disks which have been closed together to a greater or less extent in the formation of the line, and, through a hand-wheel on the feed-disk shaft and keys in the hubs of the feed-disks, engaging a spline or keyway on the shaft, returns the feed-disks to their initial position—that is, with the highest serrations uppermost and the series occupying the maximum length upon the shaft. At the same time the matrix-blank holder which has been carried to the right by the drawing apart of the disks is fed upward a previously-determined distance, to separate the impressed line from the next succeeding one. Such vertical feed is effected through a pin on the vertical slide of the matrix-blank holder, which, as the latter is retracted in the rearrangement of the feed-disks, rides up over a fixed incline and correspondingly draws up the matrix-blank holder. In addition to the feed-disks for the several classes of letter and character dies, four feed-disks are provided for the interposition of proper spaces between the several words of a line. It being desirable to have one of these disks so serrated as to give the exact feed of the letter class corresponding in width with figures, and another the feed of the class corresponding in width with points, these two feeds are made the basis of the arrangement of the spacing-disks. A certain determined fraction of an inch (as, in the case of the machine illustrated, nine one-thousandths of an inch) being assumed as a unit of measure, and all the spaces being multiples of the smallest, the spacing-disks are termed, say, "one," "two," "four," and "six," and with them any required space may be interposed within a line.

Figure 2:
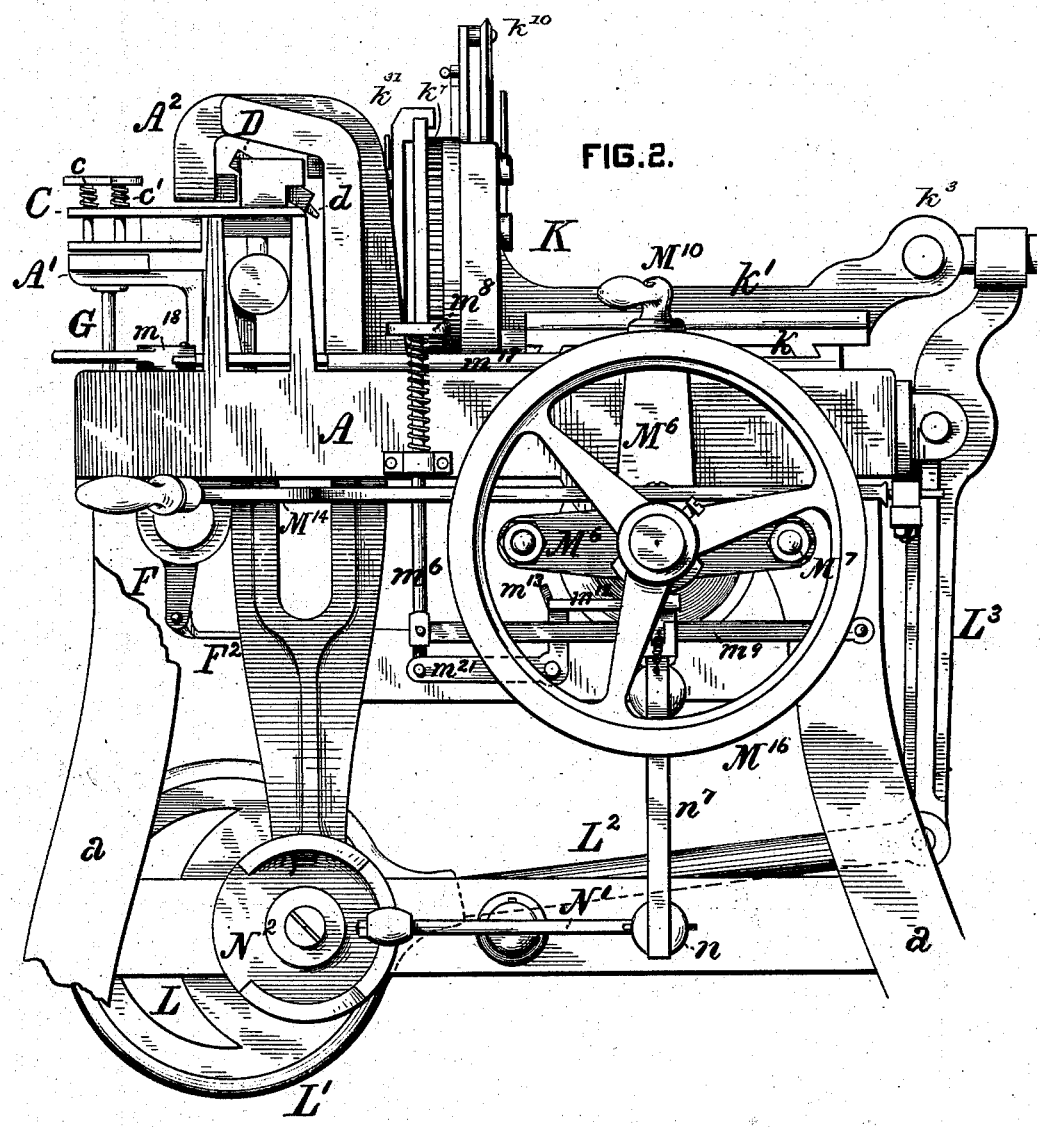
Figure 3:
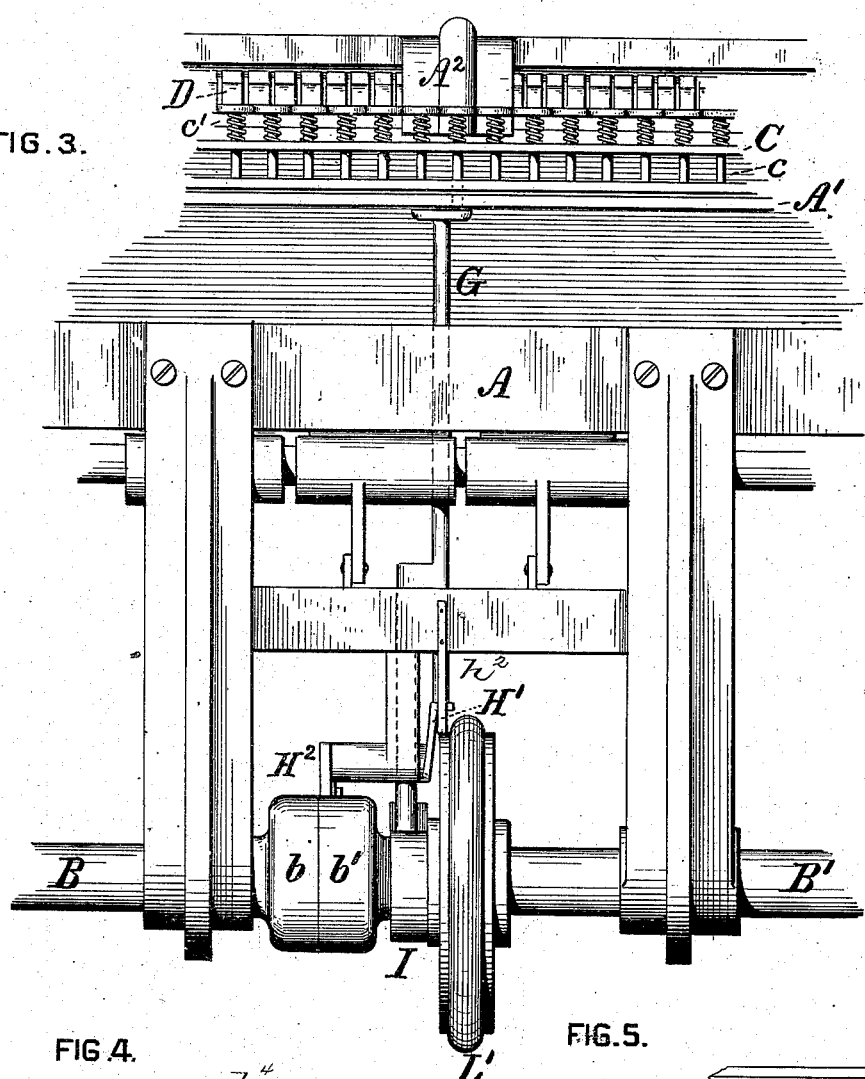
Figure 4:
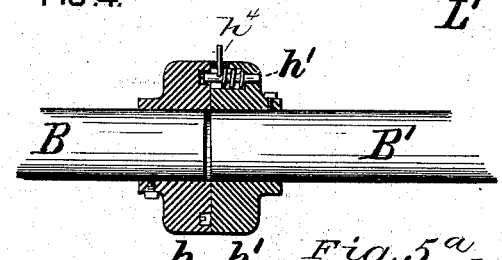
Figure 5:
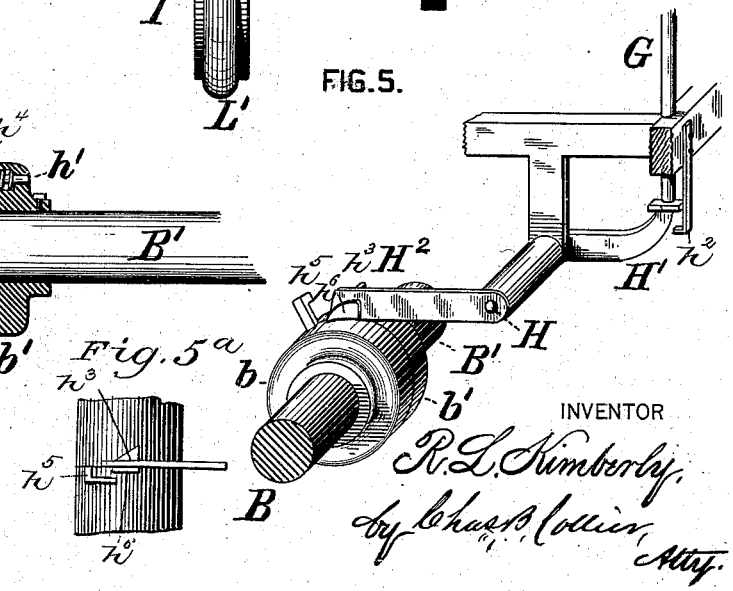
Figure 6:
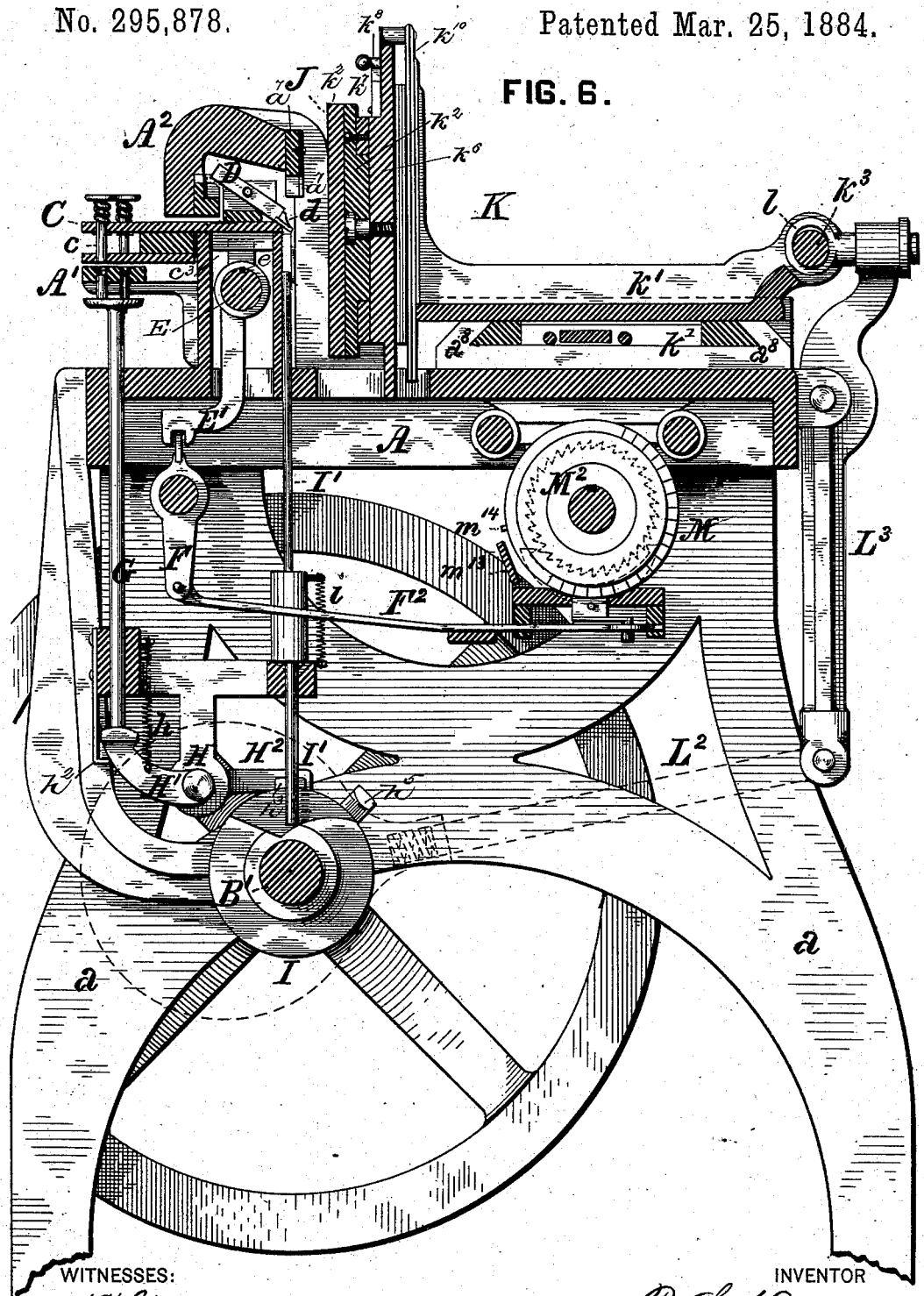
Figure 7:
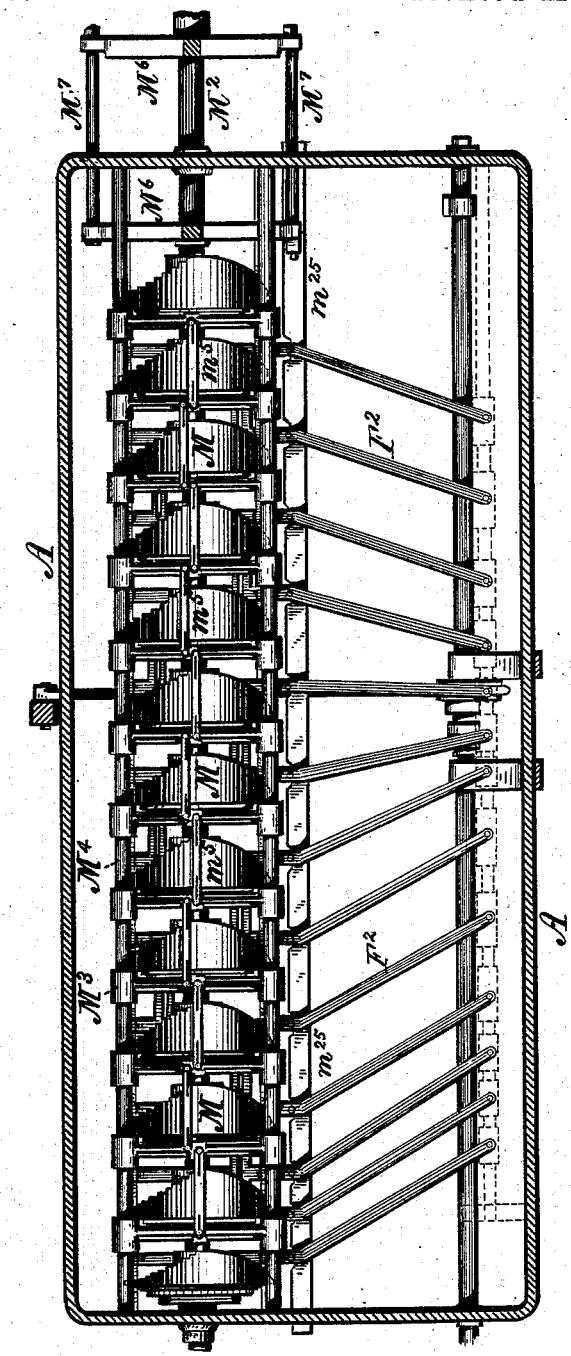
Figure 8:
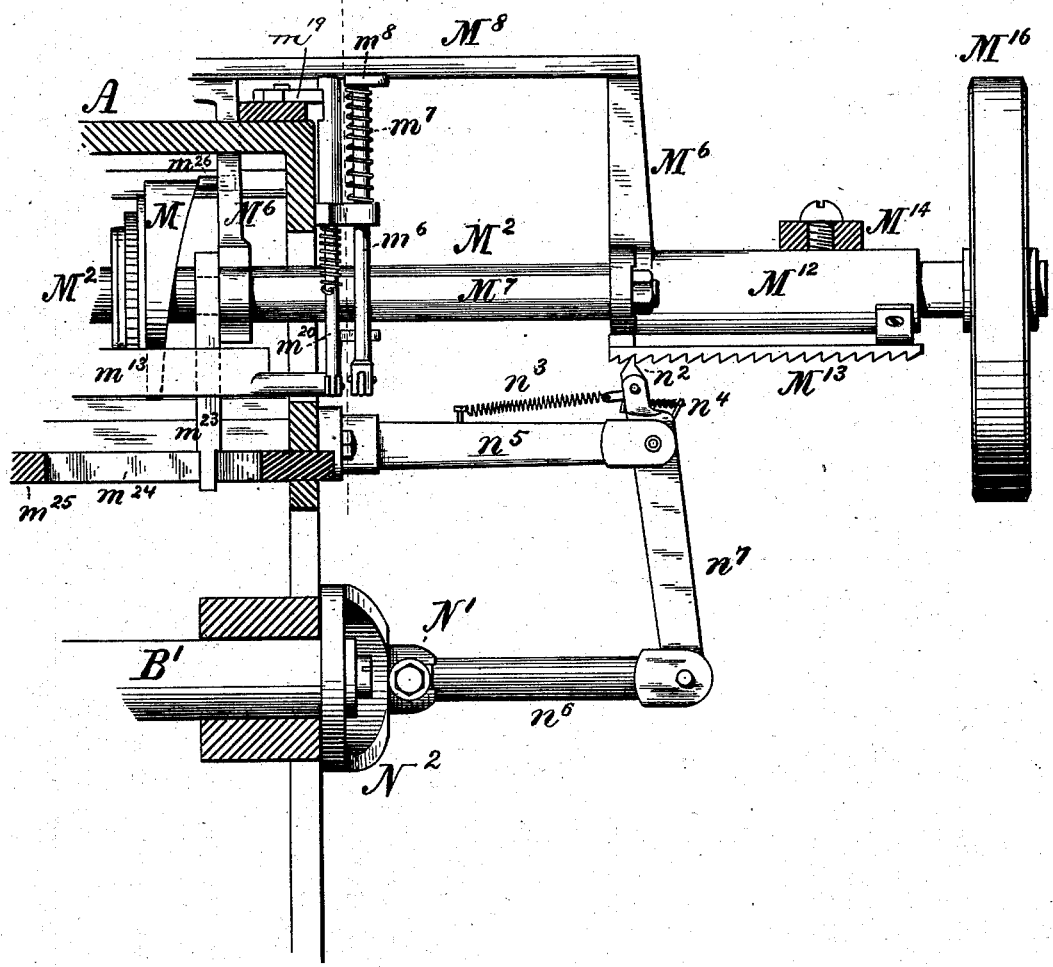
Figure 12:
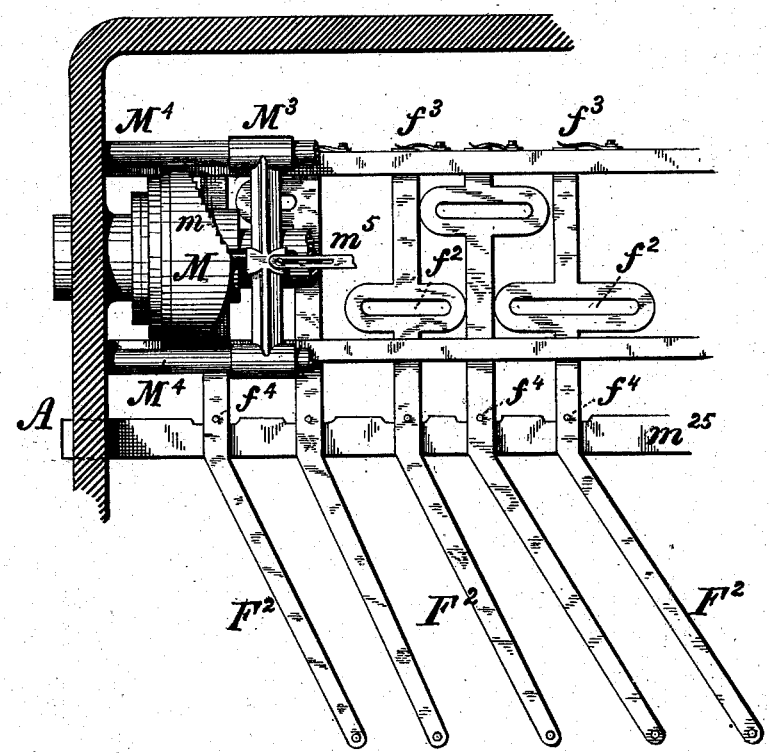
Figure 14:
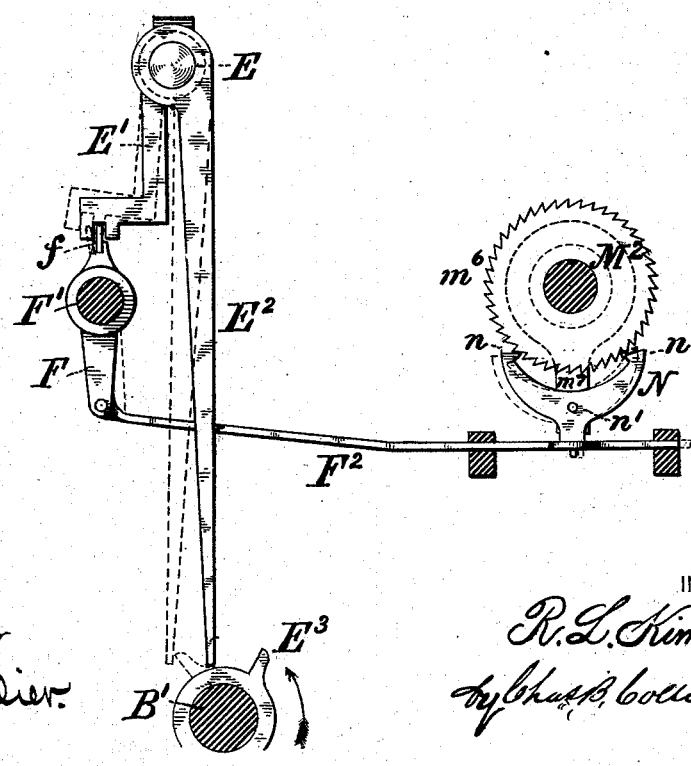
Figure 15:
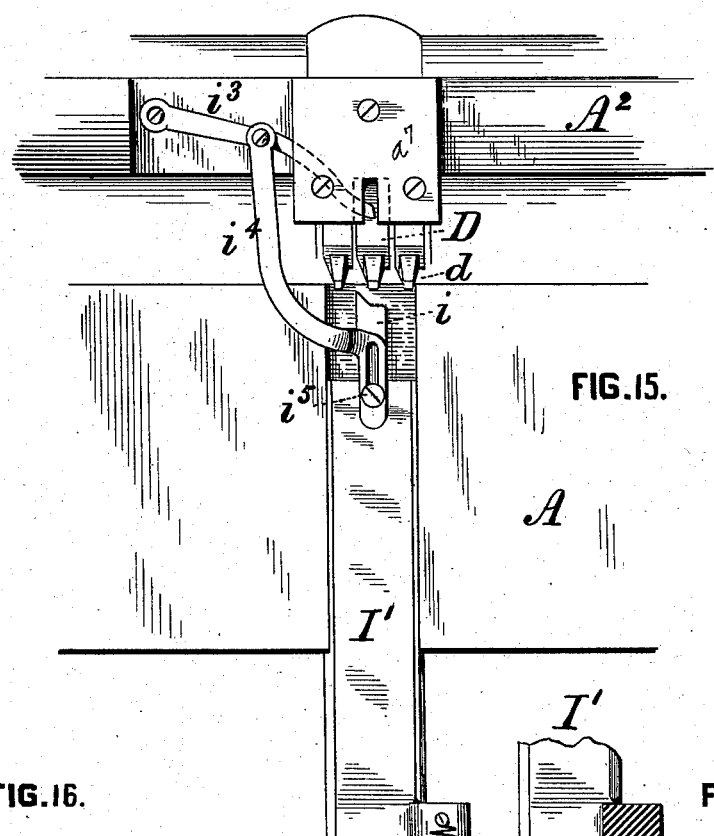
Figure 16:
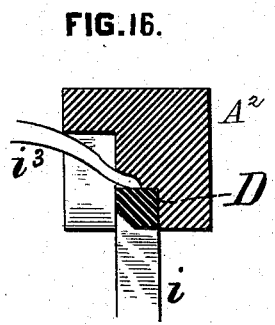
Figure 23:
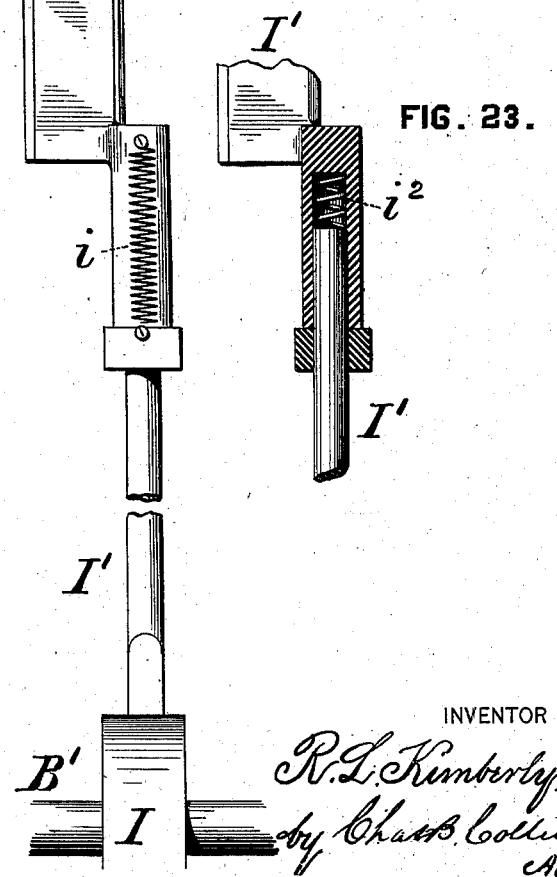
Figure 17:
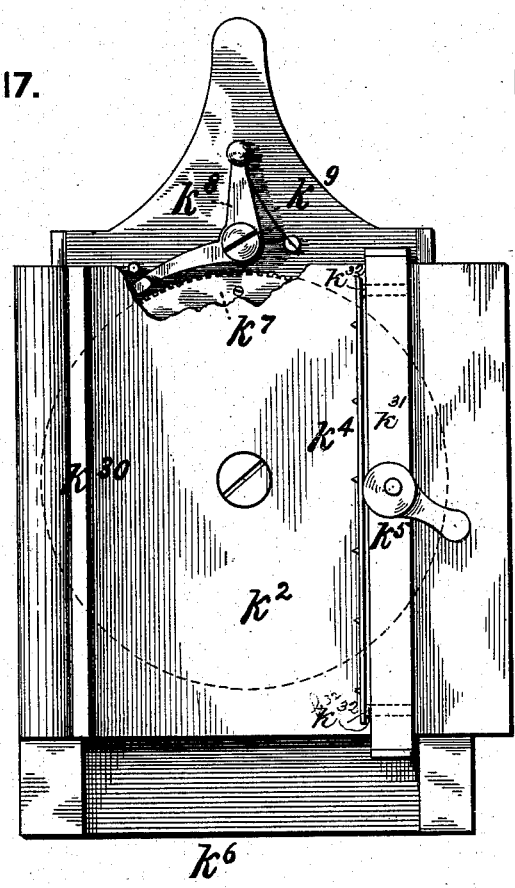
Figure 18:
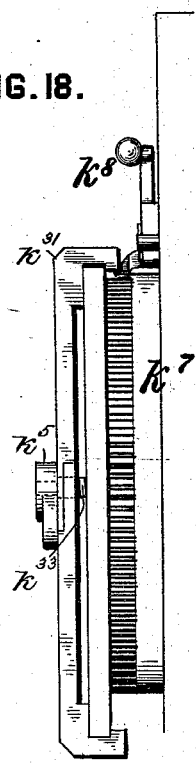
Figure 19:
Figure 20:
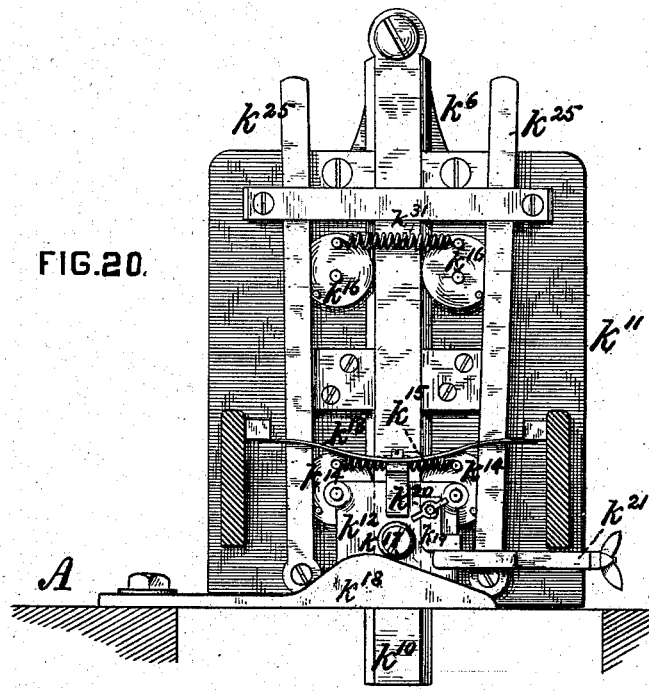
Figure 22:
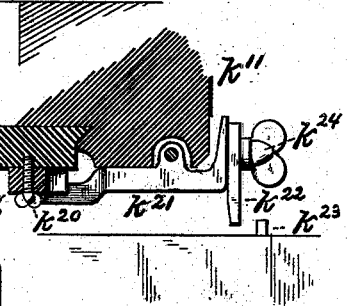
Figure 21:
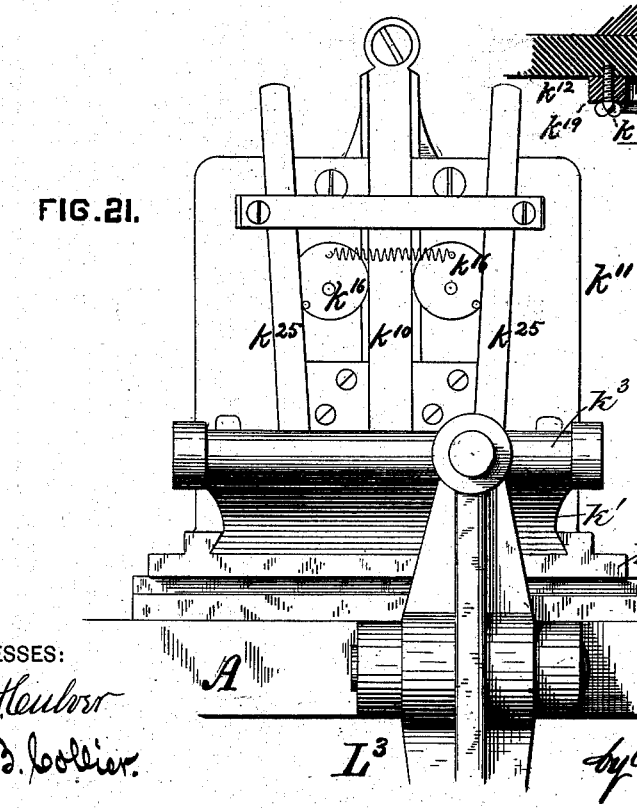

In the accompanying drawings, Figure 1 is a plan or top view of my machine for making matrices; Fig. 2, an end view in elevation of the same as seen from the right; Fig. 3, a front view in elevation of a portion of the same at and adjacent to the impressing mechanism; Fig. 4, a longitudinal central section through the driving-clutch; Fig. 5, a view in perspective of the same and its attachments; Fig. 5$^a$ is a view of the same from above; Fig. 6, a transverse section through the same at the line $x\,x$ of Fig. 3; Fig. 7, a plan or top view of the disks and their operating-arms as seen with the top of the frame or table removed; Fig. 8, a vertical longitudinal section through a portion of the machine at the right-hand end, showing the releasing mechanism of the feed-disks; Fig. 9, a transverse section through the feed-disk shaft, taken near the right-hand end of the machine; Fig. 10, a vertical longitudinal section through a portion of the feed-disk shaft and series of feed-disks; Fig. 11, an end view in elevation of one of the feed-disks as seen from the left; Fig. 12, a plan or top view of a portion of the series of links connecting the rockers with the feed-disks; Fig. 13, a view, partly in plan and partly in section, of portion of the key-board; Fig. 14, a vertical transverse section through the driving and feed shafts, illustrating the mechanism for imparting rotation to the feed-disks; Fig. 15, a view in elevation and on an enlarged scale, showing the mechanism for adjusting the dies in the fixed guide and for releasing them therefrom; Fig. 16, a vertical transverse section through said guide, with a die clamped therein; Fig. 17, a front view in elevation of the matrix-blank holder; Fig. 18, a side view thereof; Fig. 19, a view in perspective of the clamping-lever thereof; Fig. 20, a rear view of the matrix-blank holder detached from its slides; Fig. 21, a similar view of the same in position upon its slides and of portion of its actuating-lever; Fig. 22, a section on an enlarged scale through a portion of the matrix-block holder, showing the retaining device for the upward feed; Fig. 23, a section through the connection of the locking and unlocking bar of the dies and its rod, and Fig. 24, a vertical transverse section through the table and key-board, taken at the center line of the die guide or socket.

A substantial frame or table, A, resting upon legs or standards $a$, serves as the support of the operative mechanism, and power is imparted through a horizontal counter-shaft, B, provided with fast and loose pulleys $b^2\,b^3$, and mounted in bearings below the top of the table. The counter-shaft B is in operation continuously rotated through the application of power from any suitable prime mover, and, to effect the impression of any one of the series of dies hereinafter described rotates a driving-shaft, B', a single revolution through the intermediation of a clutch-coupling and suitable tripping mechanism. One section, $b$, of the clutch-coupling is secured upon the counter-shaft B, and the other section, $b'$, upon the driving-shaft B', which is mounted beneath the table in line axially with the counter-shaft.

The specific construction of the clutch-coupling need not be here described, as any mechanism suitable for the purpose may be employed, an instance thereof which is substantially similar to that of the machine illustrated in the drawings being fully described and shown in an application for Letters Patent of the United States filed by me under date of August 3, 1882, Serial No. 68,385.

The several dies of each series or "font" are mounted in a key-board, C, which is adapted to be inserted in and removed from the machine at pleasure, so that any particular font may be used whenever required, and removed to admit of the substitution of the key-board of any other desired font. The key-board C is fitted to slide horizontally and longitudinally upon the machine over friction-rollers $a'$, mounted in bearings in guides or ways $a^2$ on the top of the table, and is provided with a handle, 50, by which it may be more readily moved to and fro and lifted from the machine, to be replaced by another. A series of dies, $d$, of hard metal, and having the configuration of the letters and characters of the font which is to be used, are formed each upon one end of a rectangular stock or body, D, the opposite end of which is plain and parallel with the face of the die. Two of the sides of the die-stock perpendicular to its face are faced off so as to present truly plane surfaces at right angles one with the other, said surfaces acting as the guide-sides of the die-stock when clamped in position for impressions, as presently to be described. Each die-stock is likewise beveled or cut at an incline opposite the angle of its two guide-sides and near its die end, as shown in Fig. 16, to engage with the correspondingly-formed end of a clamping rod or bar, by which it is locked in impressing position, as required. The series of die-stocks is pivoted freely and independently upon stems $d'$, resting in line longitudinally in bearings or blocks $d^2$ on one side of the key-board, the stems passing through the stocks at such portion of their length that the preponderance of weight shall be at their die ends, thereby causing the die-stocks to hang in an inclined position when not effecting an impression, as seen in Figs. 2, 6, 15, and 24. The blocks $d^2$, which carry the pivots of the die-stocks, have the capacity of a limited degree of movement in the line of the die-stocks, as governed by springs $d^3$, interposed between one of their sides and an abutment on the key-board, in order to admit of the slight longitudinal movement of the die-stocks required to bring their blank ends to a proper bearing against the abutment $a^6$, upon which the impressing force is exerted. The dies of each font are arranged in sets or classes, according to their width of face, as shown in Fig. 13, those of the same width being placed together. In manufacturing the dies the width of their several faces is governed by the space (being a determined fraction of an inch) which the letter or character which they are designed to impress should occupy in a line, together with one-half the space on each side, which is necessary to properly separate it from the preceding and the following letter or character in the line.

A series of keys, $c$, corresponding in number with the dies, is located and its members fitted to move freely in vertical holes formed in the key-board, on the front side thereof, or in upper and lower plates secured thereto. A flat head suited to receive the impression of a finger of the operator, and marked with the letter or character of the die which is to be governed by the key—that is to say, the die whose location and impression it primarily effects—is secured upon the top of each key, and a spring, $c'$, bearing against the lower side of the head, serves to maintain the key in its highest position, so as to be completely clear of the table, except when depressed by the operator for the purpose of locating, locking, and impressing its die. The several keys are arranged upon the key-board in such positions relatively to their respective dies that when by the movement of the key-board any one of them is brought above one or the other of two vertical openings, $a^3$ $a^4$, formed in a bar, A', secured longitudinally upon the front of the table, beneath the key-board, the die with which the selected key corresponds will stand in line transversely of the machine with a stationary guide, socket, or recess, $a^5$, on the frame, so that when swung upwardly upon its stem or pivot $d'$ the end portion of its stock or shank D will enter said recess, and may be clamped firmly therein prior to effecting its impression. By reference to Fig. 1 it will be seen that the keys are arranged in double line longitudinally on the key-board, and are alternated in position transversely—that is, each member of one line is opposite a blank or solid space in the other. It therefore follows that the openings $a^3$ and $a^4$ of the bar A', which are in line transversely, cannot be simultaneously engaged by keys, and consequently the depression of any selected key by the operator insures that its proper die-stock, and no other, shall be located longitudinally in proper relation to the guide which it is to enter preparatory to impression. The depressed key slides over the surface of the bar A' until, reaching the opening beneath the line in which it is located, it drops therein and stops the further movement of the key-board, and by such operation the dies may be successively selected and impressed with rapidity and accuracy.

The guide, socket, or recess $a^5$, which receives the die-stocks as they are successively selected for the impression of their dies, is located at or near the middle of the table longitudinally, and is formed in the lower portion of a stout rib or web, $A^2$, of the frame, or, as shown, in bars secured to said web, which projects upwardly from the frame over the key-board, so as to permit the latter to slide freely beneath it, as illustrated in Figs. 2, 6, and 24. The direction of the guide $a^5$ is perpendicular to the line of movement of the key-board, and it is divided into two completely detached portions by a clear opening, the form and dimensions of which are such as to admit of the free passage through it of the standards which support the die-stocks, together with said stocks, when in their normal inclined position before location. (See Fig. 24.) The forward portion of the guide—that is to say, the portion nearest the front of the machine—terminates at a fixed abutment, $a^6$, against which the blank end of the die-stock bears when the latter is turned into a horizontal position, and a shield or guard, $a^7$, having an opening of sufficient size to admit the dies, is secured upon the outer end of the rear portion of the guide, the die projecting through the opening of the shield for a distance equal to the depth of impression which is required to be made in the matrix material. It will be observed that the shield is formed separately from the bar in which the guide or recess is cut simply for convenience of construction, and that its function could be equivalently performed by correspondingly regulating the length of and the dimensions of the end slot in the rear portion of the guide, if preferred.

A horizontal rock-shaft, E, having a longitudinal spline or keyway, $e$, is mounted on bearings on the table A, beneath and about in line vertically with the position of the axial line of the stems $d'$ of the die-stocks, and a clutch piece or arm, E', having an upward projection, $e'$, which engages a slot or recess in a lug, $c^2$, on the lower side of the key-board C, is fitted to move freely along said rock-shaft. A key or feather on the hub of the clutch-piece E' engages the spline $e$ of the rock-shaft, and the clutch-piece is thereby caused to partake of the rocking movements of said shaft, while free to be moved longitudinally to different positions thereon, in accordance with the movements of the key-board with which, as before stated, it is engaged. A slot or recess, $e^2$, in the lower end of the clutch-piece E is adapted to engage with any one of a series of tongues, $f$, secured in the upper arms of rockers F, which are mounted upon a fixed horizontal shaft, F', below the table, the lower arm of each rocker being connected by a bar or link, $F^2$, with a device for partially rotating one of a series of feed-disks, to be presently described.

An arm, $E^2$, Fig. 14, is secured upon the shaft E, and projects downwardly for such distance as to be vibrated by a cam, $E^3$, on the driving-shaft B', near the right-hand end of the machine. At each revolution of said shaft the rocker F, with which the clutch-piece E' is engaged, will be vibrated by the movement of the latter, and will correspondingly rotate the feed-disk with which it is connected. The rockers and feed-disks are so located relatively to the series of dies that the movement of the key-board which locates any selected die in position to enter the guide $a^5$ will coincidently cause the engagement of the clutch-piece with the rocker of the feed-disk proper to impart the degree of lateral movement to the matrix-bed required by the width of the class of letters or characters to which the selected die belongs.

As above described, the primary results of the depression of the key of any selected die and the movement of the key-board until said key enters one of the two openings $a^3$ or $a^4$ of the table are to properly locate the stock of the selected die to be clamped in impressing position in the guide $a^5$, and to engage the clutch-piece E' with the rocker F, which actuates the proper feed-disk. The next succeeding result which ensues upon the depression of the key to its farthest limit is the rotation of the driving-shaft B' for a single revolution, the first effect of which is the lateral movement of the matrix bed or block the distance required for the proper feed of the die, next the clamping of the die-stock in the guide, and thereafter the impressing of the die in the matrix-bed, followed in due course by the release of the die-stock, the retraction of the matrix-bed, and the arrangement of the feed-disks in proper mutual relation for a new operation. The rotation of the driving-shaft is effected through a tripping-rod, G, which is fitted to slide vertically in bearings on the forward side of the frame A, and is provided at top with two pins, $g\ g$, entering the openings $a^3\ a^4$ of the table, which receive the selected keys. A key, when entered into and depressed in one of said openings, will bear upon the pin $g$ therein, and thereby depress the tripping-rod G. The lower end of the tripping-rod rests upon the outer end of one arm, H', of a rock-shaft, H, journaled in the frame, the opposite arm, $H^2$, of which, when raised by the depression of the rod G, removes the incline 40 on the end of the arm H'' from the path of the stud 41, projecting from a sliding pin, $h'$, and thus allows the engagement of this pin, which is on that section $b'$ of the clutch-coupling which is secured to the driving-shaft B', with one of a series of spurs or drivers on the other section, $b$, of said coupling, which is secured to the continuously-rotating counter-shaft B. Such engagement produces one revolution of the driving-shaft, after which the pin $h'$ is returned to its former position in readiness to be moved out for the next succeeding revolution. The hook 42, riding over the incline 43, positively returns the arm H'' to position. A spring, $h$, connecting the rock-shaft arm H' with the frame, returns the tripping-rod G to its highest position when the pressure of the key is released from either of its pins $g$, and depresses the opposite rock-shaft arm, $H^2$, into proper position for tripping the clutch when next required so to do. The extent of motion of the rock-shaft is limited by a stop, $h^2$.

Upon the rotation of the driving-shaft the cam $E^3$ first performs its function of partially rotating a feed-disk, as before described, and the next operation—to wit, the locking of the die in the guide—is effected by a cam, I, secured upon the driving-shaft B' in such relation to the cam $E^3$ as to act subsequently to the latter. The cam I, in its rotation, forces upward a locking-bar, I', which is formed in two sections, the upper of which moves in vertical guides on the frame, and carries upon its top a clamping-piece, $i$, which is beveled or inclined on its face in correspondence with the beveled or inclined recesses formed on the die-stocks opposite the angles of their guide-sides. Upon the elevation of the locking-bar to the upper limit of its traverse by the cam I, the clamping-piece $i$ lifts the located die-stock into a horizontal position, and its beveled face, bearing against the correspondingly-beveled recess of the die-stock, locks the latter firmly in position in the guide $a^5$ by pressing its two regulating or guide sides against the corresponding sides of the guide, its blank end being adjusted by means of the springs $d^3$ to bear against the end abutment, $a^6$, thereof. The upper and lower sections of the locking-bar I' are connected by a spring, $i'$, so that their descending movement may be coincident, and this is effected by their own gravity, supplemented, if desired, by a spring or weight. The end of the lower section of the locking-bar fits into a socket on the upper section, a spring, $i^2$, being interposed to compensate for wear and prevent the exertion of undue pressure upon the die-stock. To insure the descent of the die-stock into its normal inclined position after an impression of its die has been made, and thereby to prevent obstruction to the next succeeding movement of the key-board, an arm, $i^3$, is pivoted to the rear of the web A of the frame, adjacent to the guide $a^5$, in such position that its free end may rest above the top of the die-stock when the latter is locked in position, and is coupled by a link, $i^4$, having a slot in its lower end, to a pin, $i^5$, on the locking-bar. The latter, in its descent, will, through the links $i^3$ and $i^4$, press down the die end of the die-stock into its proper position should it fail to fall thereinto by its own gravity.

The matrix bed or block J, in lieu of being held stationary to receive an impression from a die which is moved up to its face, as has generally been the case heretofore, is, under my present invention, moved up to and pressed against a die, which, as described, is stationary and bears against a fixed abutment. To this end it is secured to a face-plate, $k^2$, on the forward end of a sectional carrier, holder, or chuck, K, the lower section, $k$, of which is fitted to slide laterally between longitudinal guides $a^8$ on the top of the table A, and to carry an upper section, $k'$, which, at each revolution of the driving-shaft B', is moved toward and from the die end of an adjusted and locked die-stock, to effect an impression of said die in the matrix-block and to retract the latter for a succeeding impression. Said transverse movements are imparted to the matrix-block carrier by an eccentric, L, secured upon the driving-shaft B', which eccentric, through its strap L' and rod $L^2$, vibrates a rocker, $L^3$, journaled on the rear side of the frame A. The lower arm of the rocker $L^3$ is coupled to the eccentric-rod $L^2$, and the upper, by a slotted eye, $l$, to a longitudinal rod, $k^3$, on the matrix-block carrier, so as to admit of the movement of the latter by the rocker irrespective of changes in its lateral position. The eccentric L is fixed upon the shaft in such relation to the cams $E^3$ and I that in the revolution of the shaft the functions of said cams—to wit, those of moving the matrix-block carrier laterally and of locking the die-stock, respectively—shall be performed prior to the completion of the impressing movement of the carrier. The matrix-block J is clamped upon the face-plate $k^2$ between a flange, $k^{30}$, on one side thereof, and a clamping-plate, $k^4$, on the opposite side, said plate having a series of prongs or projections adapted to engage the matrix material, and being pressed against the same by an eccentric, $k^5$. The clamping-plate $k^4$ has pins 45, entering holes in an adjustable piece, 46, which may be clamped in any position by a screw, 47, passing through the piece 46, bearing against the face-plate carrying the eccentric $k^5$, and operated by the same handle. In order to present the matrix-block at different angles, as desired, to the dies, the face-plate may be, as shown, journaled centrally on the vertical supporting-plate $k^6$ of the carrier, and in such case may be adjusted about the center of its journal by a toothed wheel or segment, $k^7$, and a pivoted bell-crank, $k^8$, and spring $k^9$. The vertical supporting-plate $k^6$ is adapted to be moved vertically relatively to the horizontal sections $k$ and $k'$ of the carrier, in order to impart the requisite vertical feed to the matrix-block at the end of each line. To provide for such movement, it is secured at top to the upper end of a slide-bar, $k^{10}$, fitted to move vertically between guides on a vertical plate, $k^{11}$, formed upon the forward end of the upper horizontal section, $k'$, of the carrier. The sliding bar $k^{10}$ and the connected vertical supporting-plate and matrix-block are shown as maintained in position vertically during the formation of a line by a pair of eccentric clamping-disks, $k^{16}$, connected by a spring, $k^{31}$; but a pawl or ratchet or any other suitable retaining device may be substituted for and will serve as the mechanical equivalent of the eccentric-disks here employed.

A saddle-plate, $k^{12}$, located near the lower portion of the plate $k^{11}$, and adapted to be moved vertically relatively thereto, carries two eccentric-disks, $k^{14}$, which are drawn together by a helical spring, $k^{15}$, so as to clamp the sliding bar $k^{10}$ between their peripheries. On the return of the matrix-block carrier to its initial position, after the completion of its longitudinal traverse in forming a line, the vertical movement required to give the proper space between the completed and the next ensuing line is imparted to the face-plate and matrix-block by the contact of a pin, $k^{17}$, on the saddle-plate $k^{12}$, with an incline, $k^{18}$, secured to the table of the machine, the saddle-plate being by such contact raised, and carrying with it the sliding bar $k^{10}$ and the face-plate and matrix-block a distance equal to the required vertical feed. The incline $k^{18}$ is secured adjustably to the table, so that by moving it toward or from the matrix-block carrier and fixing it in position as required a greater or less amount of vertical feed may be imparted to the matrix-block. A spring, $k^{15}$, bears upon the top of the saddle-plate, so as to insure the descent of the latter into proper position to allow its clamping-disks to take a new hold upon the sliding bar after each vertical movement.

A lug, $k^{19}$, is secured by a thumb-screw, $k^{20}$, to the saddle-plate $k^{12}$, so as to be adjustable vertically upon said plate, and a double-armed tripping-lever, $k^{21}$, is pivoted to the vertical plate $k^{11}$ of the matrix-block holder in such relation to said lug $k^{19}$ that one of its arms may fit beneath the same when the saddle-plate has been moved upward by the contact of the pin $k^{17}$ with the incline $k^{18}$, said arm preventing the saddle-plate from dropping down and imparting a series of short upward feeds to the sliding bar $k^{10}$ as the matrix-block is carried to the right after each impression by the releasing device of the feed mechanism presently to be described. When the matrix-block holder, in its traverse in the formation of a line, has carried the pin $k^{17}$ beyond the reach of the incline $k^{18}$, an arm, $k^{22}$, secured to the end of the tripping-lever $k^{21}$ farthest from the lug $k^{19}$, strikes a pin, $k^{23}$, fixed to the table, and thereby releases the opposite end of the lever from the lug $k^{19}$, upon which release the saddle-plate drops a distance equal to that which it has been raised by the contact of the pin $k^{17}$ with the incline $k^{18}$, and is in readiness to again impart a vertical feed to the matrix-block after the completion of the line. The arm $k^{22}$ is connected adjustably to the tripping-piece $k^{21}$, as by a screw, $k^{24}$, passing through a slotted hole, so as to admit of changes in its position as required by different thicknesses of blocks. Upon the completion of the matrix the sliding bar $k^{10}$ is unlocked by the movement of a pair of pivoted levers, $k^{25}$, which bear against the eccentric clamping-disks, and the face-plate is returned to its initial vertical position in readiness for the insertion of another matrix-block.

The lateral movement of the matrix-block carrier prior to each impression, by which the proper spacing of the letters and characters in the line is effected, and which, as before stated, is the first operation resultant upon a revolution of the driving-shaft, may be imparted by any proper feed mechanism so organized that the traverse of the matrix-block carrier shall in each case be exactly equal to the space required in a line by any one of the class of letters or characters to which the letter or character to be impressed belongs. The special feed mechanism employed in the machine shown in the drawings, being designed for and applicable to functions other than those performed by it in combination with other members of the structure herein set forth, does not, *per se*, constitute part of my present invention, and is herein described only for the purpose of exemplifying one practical means of effecting the required lateral movements of the matrix-block. It constitutes, however, the subject-matter of an application for Letters Patent filed by me the 11th day of January, 1884.

In the feed mechanism herein illustrated the letters and characters composing the font have been divided, as to their width of face, into seven separate classes, and the formation of one or a multiple of any one space of four different classes (of which the smallest is a measure of the other three) has likewise been provided for. As a consequence, at least eleven separate feed-disks would be required; but, for convenience of construction, the disks of the three feeds most frequently used have been duplicated, thus making fourteen in all. The construction of said feed-disks and their combination with other members of the mechanism will now be described.

Each of the feed-disks M (see Figs 10 and 11) is fitted loosely upon a sleeve, M′, having an internal key or feather, $m'$, fitting a longitudinal groove, $m^2$, in a horizontal feed-shaft, $M^2$, mounted and adapted to be rotated in bearings beneath the table A, adjacent to the rear side thereof. An external stop, $m^3$, is formed upon each of the sleeves M′, against which a corresponding stop, $m^4$, on the disk M, carried by said sleeve, abuts. It will thus be seen that each feed disk may be rotated upon its sleeve in the direction of the arrow, Fig. 11, until its stop $m^4$ comes in contact with the stop $m^3$ of the sleeve, and the sleeves may be moved longitudinally on the feed-shaft, but cannot be rotated independently thereof. Each feed-disk has a circumferential flange, which is cut from its outer edge or highest point to a point at or near the side of the disk into a series of steps, serrations, or shoulders, $m$, the depth of each of which is equal to the length of lateral movement which the disk is designed to regulate and govern. A series of sliding pieces, $M^3$, is fitted to move freely longitudinally upon guide rods or bars $M^4$ above and parallel with the feed-shaft $M^2$, each of said sliding pieces having formed upon or secured to it a distance-piece, $M^5$, Fig. 10, interposed between and having its ends bearing against the plain side of one of the feed-disks and the stepped or serrated flange of another. The sliding pieces $M^3$ are coupled together by slotted links $m^5$, the slots of said links permitting each of the sliding pieces to close up or move toward the left as the feed-disk on the left thereof is rotated, so as to bring a lower step or serration of said disk in contact with the distance-piece carried by the sliding piece.

In the position shown in Fig. 7, which is that occupied at the commencement of a line, all the feed-disks stand with their highest serrations (or those farthest from their plain sides) uppermost and in contact with the distance-pieces. The series of sliding pieces is drawn out to its fullest extent, and is prevented from being closed up or moved to the left by the interposition of the distance-pieces between the plain and the stepped sides of the feed-disks. At each partial rotation of any one of the feed-disks M corresponding to and coincident with the impression of a die of the class to which said disk is apportioned, all the sliding pieces to the right of said disk will be free to move to the left a distance equal to the depth of one of the steps $m$ of said disk, and no more, and such freedom of movement to the left over a determined traverse which will correspondingly be imparted to any movable member which may bear against the feed-disk on the right of the series is, in the machine herein described, applied in effecting the regulated lateral feed of the matrix-block carrier. Rotation is imparted to the feed-disks severally by a series of double-armed anchor or pawl pieces, N, each of which is forked at one of its ends and provided with pawls $n$, which engage a series of ratchet-teeth, $m^6$, formed on the adjacent feed-disk. The anchor-pieces N are pivoted by pins $n'$ to downwardly-projecting arms $m^7$, and their ends, below their pivots $n'$, engage slots $f^2$ in links $F^2$, each of which is coupled to one of the rockers F, before described, and, by the vibration of said rocker, is moved transversely to the axis of the feed-shaft $M^2$. The purpose of the slots $f^2$ is to maintain the engagement of the links with the anchor-pieces irrespective of the longitudinal movements of the feed-disks. Springs $f^3$, bearing against the outer ends of the links $F^2$, return the anchor-pieces to proper position after each partial rotation of their respective feed-disks.

The successive lateral movements of the matrix-block holder K to the left in the formation of a line are effected either by the gravity of a weight, the action of pressure upon a movable piston, or by the tension of a spring, $M^{11}$, one end of which is connected to the table A and the other to a strap or bar, $M^9$, secured to the matrix-block carrier, and the occurrence and degree of said movements is coincident with and governed by those of a sliding frame composed of a pair of cross-heads $M^6$. one of which carries a sleeve, $M^{12}$, a pair of connecting-bolts, $M^7$, and an upper strap or bar, $M^8$. Said frame is fitted to move freely longitudinally on the feed-shaft $M^2$, and is coupled adjustably to the matrix-block carrier by a hand-screw, $M^{10}$, connecting the bars $M^8$ and $M^9$, the object of such adjustable connection being to enable the matrix-block holder to be moved into position to be started at any desired point in a line. The inner of the two cross-heads $M^6$—to wit, that nearest the feed-disks—is provided with a pin, $m^{26}$, which abuts against the right-hand disk of the series, and the frame is drawn up to the same by the spring $M^{11}$, which keeps the series of disks closed together and maintains the bearing of the sliding frame against the right-hand disk as any or all of the series are turned from higher to lower serrations. Upon the rotation of the driving-shaft $B'$ resultant upon striking any desired key, as before set forth, and after the movement of the feed-disk required, a cam, $N^2$, secured upon the right-hand end of said driving-shaft, moves a rocking lever, $N'$, pivoted to the frame A, and coupled at its opposite end by a connecting-rod, $n^6$, to a rocking pawl-lever, $n^7$. Said pawl-lever carries on its opposite end a pivoted pawl, $n^2$, which engages a longitudinal ratchet, $M^{13}$, on the sleeve, $M^{12}$, of the sliding frame $M^6$ $M^6$ $M^7$ $M^8$ $M^{12}$. The pawl $n^2$ is pivoted to the lever $n^7$, and is coupled by a spring, $n^4$, so as to act only in one direction, in order that the sliding frame may be drawn past it to the right, prior to the commencement of each new line of impressions. The lever $n^7$ is coupled by a spring, $n^3$, to a post, $n^5$, on the frame, in which post it is pivoted. The effect of the movement of the rocking lever $N'$ is to release the pawl $n^2$ from the ratchet $M^{13}$, and thereby to render the sliding frame and its connections subject to the traction of the spring $M^{11}$, which closes up the series of feed-disks to the left. The impression of the die being made in the matrix-block and the matrix-block holder drawn back from the die, the cam $N^2$, at the completion of the revolution of the driving-shaft, effects the movement of the rocking lever $N'$ in the opposite direction, engaging the pawl $n^2$ with the ratchet $M^{13}$ and moving the sliding frame to the right. By such movement the tension of the spring $M^{11}$ upon the series of feed-disks is released, thereby leaving all of said disks free, so that any one of them may be rotated for the impression desired. Upon the completion of a line the sliding frame is drawn to the right by a hand-lever, $M^{14}$, coupled to the sleeve $M^{12}$, carrying with it the matrix-block holder to position for commencing another line and separating the series of feed-disks to the greatest length occupied when turned with their highest serrations upward. The operator then depresses a button, $m^8$, on the top of a vertically-sliding rod, $m^6$, which, through a lever, $m^9$, pivoted to the frame, withdraws a pin, $m^{10}$, from its engagement with a recess in the feed-shaft $M^2$, such engagement having been made for the purpose of locking the feed-shaft as against rotation during the formation of the line. The feed-shaft is then rotated by the hand-wheel $M^{16}$, and the series of feed-disks is turned so that all shall stand with the highest serrations of their flanges uppermost. In such rotation of the feed-shaft a pin, $m^{11}$, thereon depresses a pivoted lever, $m^{12}$, and swings a flat bar, $m^{13}$, against the peripheries of the feed-disks. Said bar, by engaging pins $m^{14}$ on the feed-disks, arrests the rotation thereof when all have been brought into such position that their highest serrations stand uppermost.

A pawl, $m^{15}$, pivoted to the table A, and pressed upon by a spring, $m^{16}$, engages a notch or catch on the sliding frame $M^6$ and connections when, by the movement of the lever $M^{14}$, said frame has been moved to the limit of its traverse to the right, and thereby holds the frame and matrix-block carrier free from the draft of the spring $M^{11}$ during the rotation of the feed-shaft by the hand-wheel. A bar, $m^{17}$, fitted to slide upon the top of the table A transversely to the feed-shaft, carries at its outer end an eccentric button, $m^{18}$, and is provided at its opposite end with a notch, which engages the pawl $m^{15}$. A spring-catch, $m^{19}$, on the bar $m^{17}$ is adapted to engage a notch in a vertical rod, $m^{20}$, which is coupled to an arm, $m^{21}$, connected to the stop-bar $m^{13}$ of the feed-disks. The spring-catch $m^{19}$ drops into the notch in the rod $m^{20}$ when the pin $m^{11}$ has turned the bar $m^{13}$ against the peripheries of the feed-disks, and its function is to hold the bar against the feed-disks during the rotation of the feed-shaft. After the feed-shaft has been rotated sufficiently to bring all the feed-disks to their proper positions, the button $m^{18}$ is turned and draws forward the sliding bar $m^{17}$, thereby releasing the pawl $m^{15}$ from the notch in the sliding frame and leaving said frame and its connections free to be acted upon by the spring $M^{11}$. At the same time the movement of the sliding bar $m^{17}$ carries the spring-catch $m^{19}$ out of contact with the rod $m^{20}$, which, by the tension of its spring $m^{22}$, and through the connection $m^{21}$, withdraws the stop-bar $m^{13}$ from its contact with the pins $m^{14}$, and leaves the feed-disks free to be rotated as required.

The anchor-pieces by which the feed-disks are rotated are moved into such positions as to give the latter greater freedom of rotation by a sliding bar, $m^{25}$, which is moved slightly to the right when the sliding frame $M^6$ and connections has, by means of the hand-lever $M^{14}$, been brought nearly to the extremity of its traverse in that direction. A lug, $m^{23}$, fastened to said frame, moves in and bears against the end of a slot, $m^{24}$, in the bar $m^{25}$, and imparts to said bar a limited longitudinal movement. The bar $m^{25}$ has upon one of its sides a series of inclines, which, in its movement, are drawn against pins $f^4$ on the links $F^2$, which move the anchor-pieces N, and, by their action on said pins, free the anchor-pieces from the ratchets, and thereby impart increased freedom of rotation to the feed-disks. Further, while in the organization of a machine embodying my improvements it is essential that proper and sufficient mechanical members shall be provided for effecting the several functions hereinbefore recited, and that the same shall co-operate, substantially in the manner set forth, in the production of a matrix, I consider variations of mechanical and constructive detail which perform, by their individual action, equivalent subordinate functions, and effect, by their combination, an equivalent result, to be within the scope of my invention, as herein set forth.

I claim as my invention and desire to secure by Letters Patent—

1. The combination, substantially as set forth, of a movable series of type or character dies, a fixed abutment, and mechanism for locating any one of said dies in a determined position relatively to said abutment.

2. The combination, substantially as set forth, of a movable series of type or character dies, a fixed abutment, a lateral guide, mechanism, substantially as described, for locating any one of said dies in determined position relatively to said abutment and guide, and mechanism for clamping the located die against said abutment and guide.

3. The combination, substantially as set forth, of a movable series of type or character dies, a fixed abutment, mechanism, substantially as described, for moving any one of said dies into and fixing it in position against said abutment, a holder or carrier adapted to receive a matrix block or blank, and mechanism, substantially as described, for moving said carrier toward the face of the die when fixed.

4. The combination, substantially as set forth, of a movable series of type or character dies, a fixed abutment, a lateral guide, mechanism, substantially as described, for moving any one of said dies into and fixing it in position against said abutment and guide, a holder or carrier adapted to receive a matrix block or blank, and mechanism, substantially as described, for moving said carrier toward the face of the die when fixed.

5. The combination, substantially as set forth, of a movable series of type or character dies, a fixed abutment, mechanism, substantially as described, for moving any one of said dies into and fixing it in position against said abutment, a holder or carrier adapted to receive a matrix block or blank, mechanism, substantially as described, for moving said carrier toward the face of the die when fixed, and a stationary plate or shield interposed between the face of the die and its abutment, and acting to limit the traverse of the matrix-block toward the latter.

6. The combination of a rigidly-held die, a reciprocating matrix-block holder, and a fixed guard or shield, substantially as described and shown.

7. The combination, substantially as set forth, of a movable series of type or character dies, members of which are of different widths of face respectively, a fixed abutment, a holder or carrier adapted to receive a matrix block or blank, mechanism for moving any one of the dies into and fixing it in position relatively to the fixed abutment, mechanism, substantially as described, for moving the matrix-block carrier toward the face of the die when located and fixed, and feed mechanism, substantially as described, connected with and actuated through the mechanism which locates each die in such manner as to impart to the matrix-block carrier a lateral traverse equal to the width of face of the located die.

8. The combination, substantially as set forth, of a sliding key-board and a series of type or character dies, each pivoted freely and independently therein.

9. The combination, substantially as set forth, of a movable key-board, a series of type or character dies pivoted therein, and a series of operating-keys.

10. The combination, substantially as set forth, of a key-board, a series of type or character dies pivoted therein on stems or pivots having a limited degree of movement in the line of the die-stocks, and springs bearing against the blocks or supports of said pivots.

11. The combination, substantially as set forth, of a frame or table, a stationary abutment secured thereto, impressing mechanism, substantially as described, mounted thereon, and a key-board carrying a series of type or character dies, and adapted to move longitudinally on the table and to be removed therefrom at pleasure.

12. The combination, substantially as set forth, of a frame or table, a stationary abutment secured thereto, a key-board adapted to move longitudinally thereon, a series of type or character dies journaled in said key-board, a series of operating-keys fitted in said key-board, and an opening in the table adapted to engage any one of said keys, these members being combined for joint operation, so that the engagement of any selected key with said opening shall locate a corresponding die in determined position relatively to the fixed abutment.

13. The combination, substantially as set forth, of a frame or table, an abutment fixed thereto and adapted to serve as an end bearing for the stock of a type or character die, and a shield or guard-plate formed upon or secured to the frame, and having its face parallel with the abutment and closer thereto than the distance between the end of the die-stock and the face of the die.

14. The combination, substantially as set forth, of a frame or table, a fixed abutment adapted to serve as an end bearing for the stock of a type or character die, and a lateral guide or socket adapted to serve as a side bearing for said die-stock.

15. The combination, substantially as set forth, of a frame or table, a fixed abutment and a lateral guide thereon, a key-board which is movable on said table transversely to said abutment and guide, a series of type or character dies pivoted freely and independently on said key-board, a series of operating-keys whereby any one of said dies may be located in determined position relatively to said abutment and guide, a clamping-bar, actuated primarily by means of the key which locates a die, to clamp the located die in position for forming an impression, and a retracting device, substantially as described, connected to and operated by said clamping-bar, to return the located die to proper position to admit of the movement of the key-board requisite for the location of another die.

16. The combination, substantially as set forth, of a frame or table, a fixed abutment thereon, mechanism for locating and holding the stock of any one of a movable series of type or character dies in position against said abutment, an intermittently-rotating driving-shaft actuated to make a single revolution in and by the location of each die-stock, a holder or carrier adapted to receive a matrix block or blank and to impart to the latter movement in three directions, a spring or weight connected to the matrix-block carrier and tending to move the same in a direction parallel with the face of the located die, mechanism, actuated by the location of each die, which permits such spring or weight to impart a determined traverse to the matrix-block carrier transversely to the face of the die, and mechanism, substantially as described, connected with and operated by the driving-shaft, for pressing the matrix-block against the face of the located die subsequent to said transverse movement of the carrier.

17. The combination, with a feed mechanism, substantially as described, of a rocking shaft adapted to be moved axially by a connection with a driving-shaft, a clutch-piece which is movable longitudinally on said rocking shaft, a sliding key-board which imparts longitudinal movement to said clutch-piece, and a series of double-armed rockers, each of which is coupled at one end to mechanism for partially rotating one of the disks of the feed mechanism, and is adapted to be engaged at the other by the clutch-piece, substantially as set forth.

18. The combination, with a feed mechanism, substantially as described, of a matrix-block carrier, a stationary abutment, a type or character die adapted to be located and fixed in position against said abutment, and mechanism, substantially as described, for pressing a matrix-block held by said carrier against the face of a die when so located, substantially as set forth.

19. The combination, with a feed mechanism, substantially as described, of a matrix-block carrier, mechanism, operated by an intermittently-rotating driving-shaft, for moving said carrier toward and from the face of a fixed type or character die, and mechanism, substantially as described, operated by said driving-shaft, for intermittently relieving the disks of said feed mechanism from the tension of the spring thereof, substantially as set forth.

20. The combination, with a feed mechanism, substantially as described, of a matrix-block carrier, mechanism, substantially as described, for moving said carrier in a direction opposite to its traverse when subject to the traction of the spring of the feed mechanism, and mechanism, substantially as described, for locking the carrier against movement during adjustment of the feed-disks, substantially as set forth.

21. A matrix-block holder having a face-plate adjustable upon a central pivot to any desired angle in the plane of its face, substantially as described and shown.

22. The combination of the centrally-pivoted face-place, the toothed-wheel fast to the face-plate, and the holding-pawl, whereby the matrix-block may be set and held at any angle in the plane of its face, substantially as described and shown.

ROBERT L. KIMBERLY.

Witnesses:
GEO. B. COLLIER,
WALTER S. GIBSON.